(12) United States Patent
Itoh

(10) Patent No.: US 8,818,087 B2
(45) Date of Patent: Aug. 26, 2014

(54) IMAGE PROCESSING APPARATUS AND NON-TRANSITORY COMPUTER READABLE MEDIUM

(71) Applicant: Fuji Xerox Co., Ltd., Tokyo (JP)

(72) Inventor: Atsushi Itoh, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 129 days.

(21) Appl. No.: 13/665,171

(22) Filed: Oct. 31, 2012

(65) Prior Publication Data

US 2013/0251250 A1 Sep. 26, 2013

(30) Foreign Application Priority Data

Mar. 23, 2012 (JP) ................................. 2012-067161

(51) Int. Cl.
  *G06K 9/34* (2006.01)
(52) U.S. Cl.
  USPC ........... 382/164; 382/162; 382/166; 382/167; 382/232
(58) Field of Classification Search
  USPC ................ 382/162, 164, 166, 167, 172, 232; 128/916; 358/1.9, 3.06, 3.27; 600/443; 345/88, 581; 257/440; 349/106, 143; 348/223.1, E9.052
  See application file for complete search history.

(56) References Cited

U.S. PATENT DOCUMENTS

| 7,662,100 | B2 * | 2/2010 | Murashita | 600/443 |
| 7,831,107 | B2 * | 11/2010 | Dai et al. | 382/266 |
| 7,957,590 | B2 * | 6/2011 | Watanabe et al. | 382/167 |
| 8,547,595 | B2 * | 10/2013 | Sakamoto | 358/1.9 |

FOREIGN PATENT DOCUMENTS

| JP | A-10-145623 | 5/1998 |
| JP | A-10-243221 | 9/1998 |

* cited by examiner

*Primary Examiner* — Anh Do
(74) *Attorney, Agent, or Firm* — Oliff PLC

(57) ABSTRACT

An image processing apparatus includes a representative color calculation unit, a color displacement calculation unit, and a similarity calculation unit. The representative color calculation unit calculates a representative color which is representative of colors in a first region having a predetermined size in an image. The color displacement calculation unit calculates, as a color displacement, a difference between the representative color calculated by the representative color calculation unit and a color in a target second region in the first region. The similarity calculation unit calculates similarity between the color displacement calculated by the color displacement calculation unit and a predetermined color displacement in an information image representing information embedded in the image.

9 Claims, 8 Drawing Sheets

IMAGE PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-067161 filed Mar. 23, 2012.

BACKGROUND

Technical Field

The present invention relates to an image processing apparatus and a non-transitory computer readable medium.

SUMMARY

According to an aspect of the invention, there is provided an image processing apparatus including a representative color calculation unit, a color displacement calculation unit, and a similarity calculation unit. The representative color calculation unit calculates a representative color which is representative of colors in a first region having a predetermined size in an image. The color displacement calculation, unit calculates, as a color displacement, a difference between the representative color calculated by the representative color calculation unit and a color in a target second region in the first region. The similarity calculation unit calculates similarity between the color displacement calculated by the color displacement calculation unit and a predetermined color displacement in an information image representing information embedded in the image.

BRIEF DESCRIPTION OF THE DRAWINGS

Exemplary embodiments of the present invention will be described in detail based on the following figures, wherein.

DETAILED DESCRIPTION

Hereinafter, various exemplary embodiments for realizing the present invention will be described with reference to the drawings.

Figure 1:
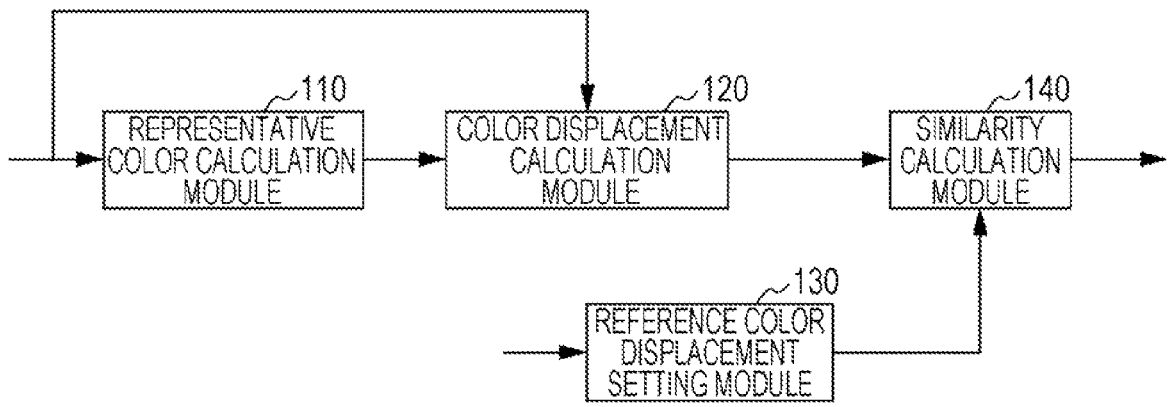
FIG. 1 is a conceptual module configuration diagram illustrating an example configuration of an image processing apparatus according to a first exemplary embodiment.

FIG. 1 is a conceptual module configuration diagram illustrating an example configuration of an image processing apparatus according to a first exemplary embodiment.

In general, "modules" are components of software (computer program) or hardware that may be logically separated from one another. Thus, the modules according to the exemplary embodiments correspond to not only modules in a computer program but also modules in a hardware configuration. Therefore, the description of the exemplary embodiments includes a description of a computer program for causing a computer to function as those modules (a program for causing a computer to execute individual program steps, a program for causing a computer to function as individual units, or a program for causing a computer to realize individual, functions), a system, and a method. For the convenience of description, expressions "store", "cause . . . to store", and expressions equivalent thereto will be used. These expressions specifically mean "cause a storage device to store" or "perform control to cause a storage device to store" in the case of a computer program. The modules may correspond to functions in a one-to-one relationship. In terms of packaging, a single module may be constituted by a single program, plural modules may be constituted by a single program, or a single module may be constituted by plural programs. Also, plural modules may be executed by a single computer, or a single module may be executed by plural computers in a distributed or parallel environment. Alternatively, a single module may include another module. Hereinafter, "connection" is used to refer to a logical connection (transmission and reception of data, providing an instruction, a reference relationship between pieces of data, etc.), as well as a physical connection. "Predetermined" means being determined before a certain operation, and includes the meaning of being determined in accordance with a present situation/state or in accordance with a previous situation/state before a certain operation after processing according to the exemplary embodiments starts, as well as before processing according to the exemplary embodiments starts. When there are plural "predetermined values", the values may be different from one another, or two or more of the values (of course, including ail the values) may be the same. A description having the meaning "in the case of A, B is performed" is used as the meaning "whether A or not is determined, and B is performed if it is determined A", except for a case where determination of whether A or not is unnecessary.

A system or apparatus may be constituted by plural computers, hardware units, devices, or the like connected to one another via a communication medium, such as a network (including communication connections having a one-to-one correspondence), or may be constituted by a single computer, hardware unit, device, or the like. "Apparatus" and "system" are used synonymously. Of course, "system" does not include merely a man-made social "organization" (social system).

Also, target information is read from a storage device in individual processing operations performed by respective modules or in individual processing operations performed by a single module. After each processing operation has ended, the processing result thereof is written into the storage device. Thus, a description of reading from the storage device before a processing operation and writing into the storage device after a processing operation may be omitted. Here, examples of the storage device include a hard disk, a random access memory (RAM), an external storage medium, a storage device connected through a communication line, a register in a central processing unit (CPU), and the like.

The image processing apparatus according to the first exemplary embodiment includes a representative color calculation module 110, a color displacement calculation module 120, a reference color displacement setting module 130, and a similarity calculation module 140, as illustrated in FIG. 1.

The image processing apparatus according to the first exemplary embodiment is used for extracting an information image in an actual image. The information image is an image code which is systematically created to represent electronic data in a machine-readable manner, and includes, for example, a trace pattern including information for specifying an image forming apparatus that has output (printed, copied, or the like) the image. The information image may be an invisible information image or a substantially invisible information image, for example, an information image which is not visible to the naked eye, an information image which is difficult for the naked eye to see, or an information image equivalent thereto. In other words, the information image is an image with low visibility (difficult for a human to see). For example, the information image is output using yellow toner.

The representative color calculation module 110 is connected to the color displacement calculation module 120. The representative color calculation module 110 calculates a representative color which is representative of colors in a first region having a predetermined size in an image. A representative color is a color which is representative of colors in a region, and is calculated using a statistical calculation method. For example, the representative color may be an average color in the region, or may be a median value or a peak value of the region. The first region will be described below with reference to FIG. 3.

The color displacement calculation module 120 is connected to the representative color calculation module 110 and the similarity calculation module 140. The color displacement calculation module 120 calculates, as a color displacement, a difference between the representative color calculated by the representative color calculation module 110 and a color in a target second region in the first region.

Figure 3:
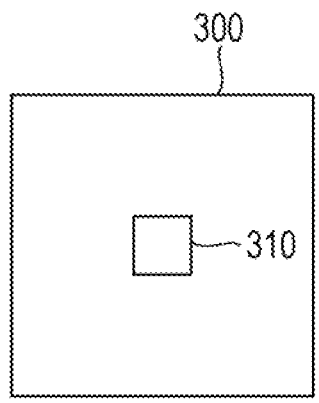
FIG. 3 is an explanatory diagram illustrating an example of the relationship between a first region and a second region.

An example of the relationship between the first region (region 300) and the second region (region 310) will be described with reference to FIG. 3. The region 310 is a region where it is expected that an information image exists. The region 310 may have a size of one pixel or more. The region 300 has a predetermined size. In FIG. 3, the region 300 is rectangular, but the shape thereof is not limited to a rectangular shape, and may be hexagonal, oval (including circular), or the like. The region 300 is large enough to include one or more regions 310, and may include the background thereof. That is, the region 300 may have such a size that the influence of the color of a background of an information image is larger than the color of the information image when the representative color calculation module 110 calculates a representative color. In FIG. 3, the region 310 is at the center of the region 300, but may not necessarily be at the center of the region 300. The shape of the region 310 is not limited to a square, but may be rectangular, L-shaped, or the like.

A color is expressed by a position in a color space (for example, three-dimensional space of YMC). Thus, a color may be expressed by a vector from an origin. A difference between colors is a difference between vectors, and is referred to as a local, color displacement here. For example, a local color displacement is a vector from a representative color to a color in the second region (region 310), or a vector from a color in the second region (region 310) to a representative color, that is, a vector defined in a two or more dimensional space.

Figure 4:
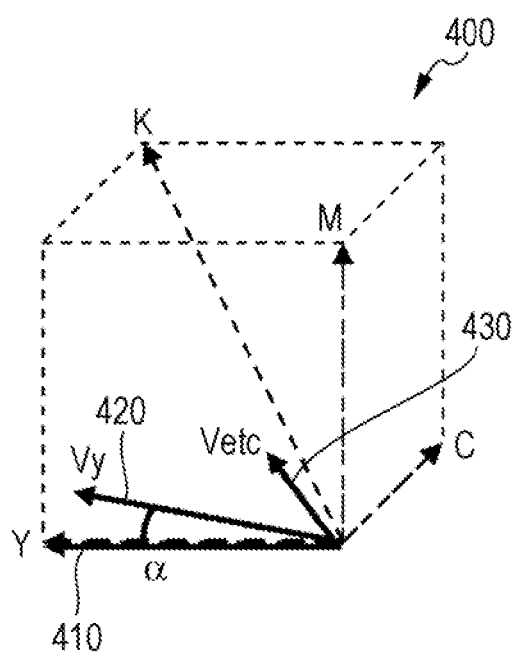
FIG. 4 is an explanatory diagram illustrating an example of a process according to the first exemplary embodiment.

FIG. 4 is an explanatory diagram illustrating an example of a process according to the first exemplary embodiment. This is an example of color displacements. In a three-dimensional color space 400 of YMC, the color displacement calculation module 120 calculates a local color displacement (Vy vector) 420, a local color displacement (Vetc vector) 430, and so forth. These vectors are expressed as displacements from an origin (Y, M, C=0).

In FIG. 4, the local color displacement (Vy vector) 420 expresses a color displacement in an information image, and the local color displacement (Vetc vector) 430 expresses a color displacement of something other than the information image, for example, noise. In the color space 400, a normal information image has a reference color displacement (Y vector) 410. Actually, the information image does not have the reference color displacement (Y vector) 410, and has the local color displacement (Vy vector) 420. This is because, when the information image exists in a region other than a white background and when another image overlaps the information image, frequency degradation, sheet surface roughness, or noose may occur at the time of output, degradation of a modulation transfer function (MTF) or degradation of color information about the information image due to a reduced diameter of the information image (decrease in color change) may occur at the time of scanning, or color fluctuation may occur at the time of output, scanning, or color conversion. It is difficult to determine whether or not the local, color displacement (Vy vector) 420 caused by the above-described factors is a color displacement in an information image by performing pattern matching or the like by using only an image in a single-color plane (for example, blue plane, which is a complementary color of yellow).

In this exemplary embodiment, similarity with respect to a normal information image is calculated by using a two or more dimensional space (in this example, three-dimensional space).

The reference color displacement setting module 130 is connected to the similarity calculation module 140. The reference color displacement setting module 130 sets a color displacement in a normal information image in the above-described color space (hereinafter also referred to as a reference color displacement). Since the color of the information image embedded in an image is predetermined, the color displacement is predetermined. In the example illustrated, in FIG. 4, the color space 400 is used.

The similarity calculation module 140 is connected to the color displacement calculation module 120 and the reference color displacement setting module 130. The similarity calculation module 140 calculates the similarity between the color displacement calculated by the color displacement calculation module 120 and a predetermined color displacement in an information image representing information embedded, in an image.

Here, "similarity" is a value calculated by using an angle α formed by a reference color displacement and a local color displacement. This corresponds to the angle α formed by the reference color displacement (Y vector) 410 and the local color displacement (Vy vector) 420 in the example illustrated in FIG. 4. The length of a vector may also be added. Similarity is calculated by using the angle α, and is calculated by using, for example; the following expressions.

$\cos(\alpha)$
$(\cos(\alpha))^n$
$|Vy|\cos(\alpha)$
$|Vy|^m(\cos(\alpha))^n$

Here, m and n are integers of one or more. As n increases, the standard with which similarity is determined becomes strict.

In the example illustrated in FIG. 4, when the similarity of the local color displacement (Vy vector) 420 is compared with the similarity of the local color displacement (Vetc vector) 430, the similarity of the local color displacement (Vy vector) 420 expresses a large value, whereas the local color displacement (Vetc vector) 430 is different from the direction of the reference color displacement (Y vector) 410 and thus the similarity thereof expresses a small value. After that, the similarity is compared with a predetermined threshold. For example, if the similarity is larger than the threshold or if the similarity is equal to or large than the threshold, the region 310 where an information image exists may be extracted.

The representative color calculation module 110 may calculate representative colors which are representative of the colors in the first region in individual color planes (for example, Y plane, M plane, C plane, etc.). In this case, representative colors of individual colors (for example, three representative colors) are calculated for the first region.

The color displacement calculation module 120 may calculate, as color displacements, the differences between the representative colors in the individual color planes calculated by the representative color calculation module 110 and the colors in the second region in the individual color planes. In this case, color displacements of the individual colors (for example, three color displacements) are calculated for the second region.

The reference color displacement setting module 130 sets reference color displacements in a normal information image in the individual color planes.

The similarity calculation module 140 calculates the similarities between the color displacements in the individual color planes calculated by the color displacement calculation module 120 and the color displacements in the predetermined individual color planes in an information image. Here, plural similarities are calculated, and one similarity may be calculated by using the plural similarities. For example, an average value of the plural similarities may be calculated, or one similarity may be calculated by performing weighting on the individual color planes.

The similarity calculation module 140 may calculate similarities for both directions of a color displacement (vector), and may regard similarity having a larger value as similarity as a calculation result. That is, the similarity with respect to a vector in an inverted direction is calculated. This is for handling the case where, for example, a background is yellow and an information image is white in the yellow.

Figure 2:
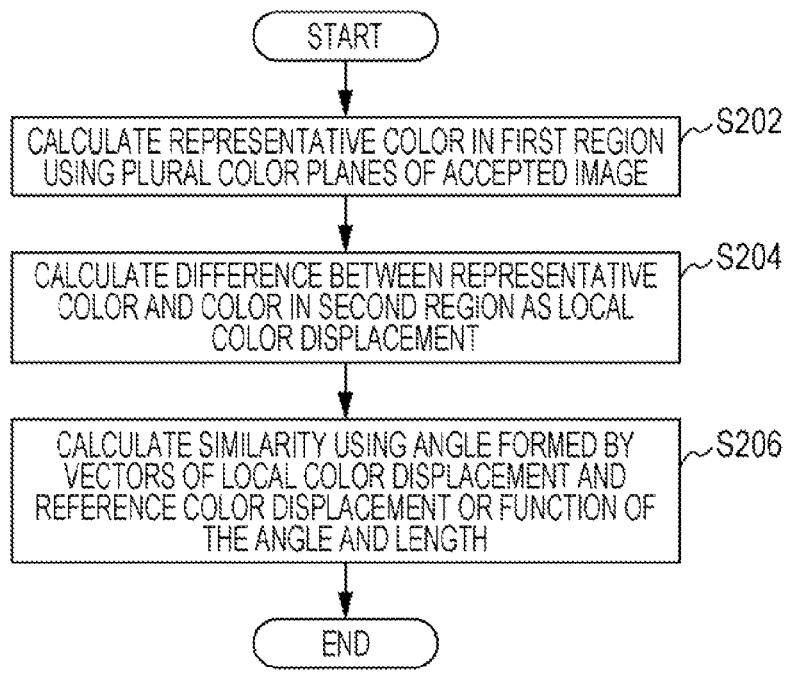
FIG. 2 is a flowchart illustrating an example of a process according to the first exemplary embodiment.

FIG. 2 is a flowchart illustrating an example of a process according to the first exemplary embodiment.

In step S202, the representative color calculation module 110 calculates a representative color in a first region by using plural color planes of an accepted image.

In step S204, the color displacement calculation module 120 calculates, as a local color displacement, the difference between the representative color and a color in a target second region.

In step S206, the similarity calculation module 140 calculates similarity by using an angle formed by vectors of the local color displacement and a reference color displacement, or a function of the angle and a length.

Figure 5:
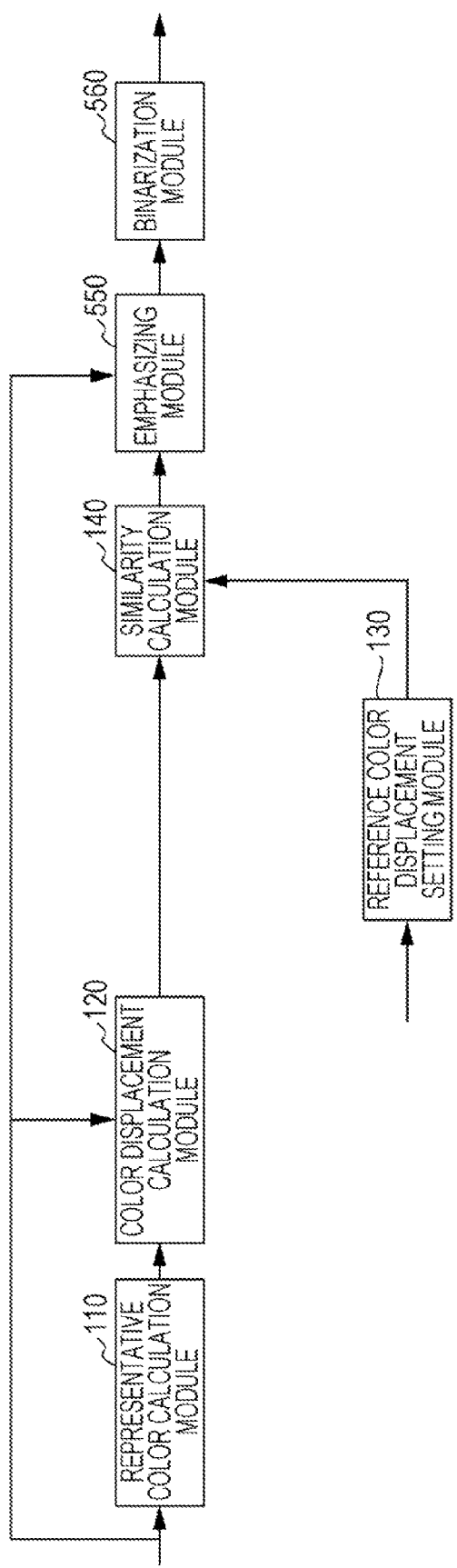
FIG. 5 is a conceptual module configuration diagram illustrating an example configuration of an image processing apparatus according to a second exemplary embodiment.

FIG. 5 is a conceptual module configuration diagram illustrating an example configuration of an image processing apparatus according to a second exemplary embodiment. As illustrated in FIG. 5, the image processing apparatus according to the second exemplary embodiment includes the reference color calculation module 110, the color displacement calculation module 120, the reference color displacement setting module 130, the similarity calculation module 140, an emphasizing module 550, and a binarization module 560. The same parts as those in the first exemplary embodiment are denoted by the same reference numerals, and the corresponding description is omitted (the same applies to the following exemplary embodiments). The configuration according to the second exemplary embodiment includes the emphasizing module 550 and the binarization module 560 in addition to the modules according to the first exemplary embodiment. Alternatively, the configuration according to the second exemplary embodiment may include any one of the emphasizing module 550 and the binarization module 560 in addition to the modules according to the first exemplary embodiment. That is, the configuration in which the similarity calculation module 140 is connected to the emphasizing module 550 but the binarization module 560 is not connected, or the configuration in which the similarity calculation module 140 is connected to the binarization module 560 may be employed.

The similarity calculation module 140 is connected to the color displacement calculation module 120, the reference color displacement setting module 130, and the emphasizing module 550.

The emphasizing module 550 is connected to the similarity calculation module 140 and the binarization module 560. The emphasizing module 550 emphasizes an accepted image in accordance with the similarity calculated by the similarity calculation module 140. That is, the emphasizing module 550 generates an image in which an information image is emphasized. The emphasizing module 550 (1) adds similarity to or (2) multiplies similarity by a reference color plane (for example, Y plane) of an accepted image. Alternatively, if the similarity is larger than a predetermined threshold or if the similarity is equal to or larger than the predetermined threshold, the emphasizing module 550 may deepen the color of the pixel, may change the color to another color, or may lighten the color of other pixels, as an emphasizing process.

The binarization module 560 is connected to the emphasizing module 550. The binarization module 560 binarizes an accepted image in accordance with the similarity calculated by the similarity calculation module 140, or binarizes the image emphasized by the emphasizing module 550. Accordingly, the portion of an information image is extracted. An example of a binarization process is a process of leaving only pixels in which similarity is larger than a predetermined threshold or similarity is equal to or larger than the predetermined threshold.

Figure 6:
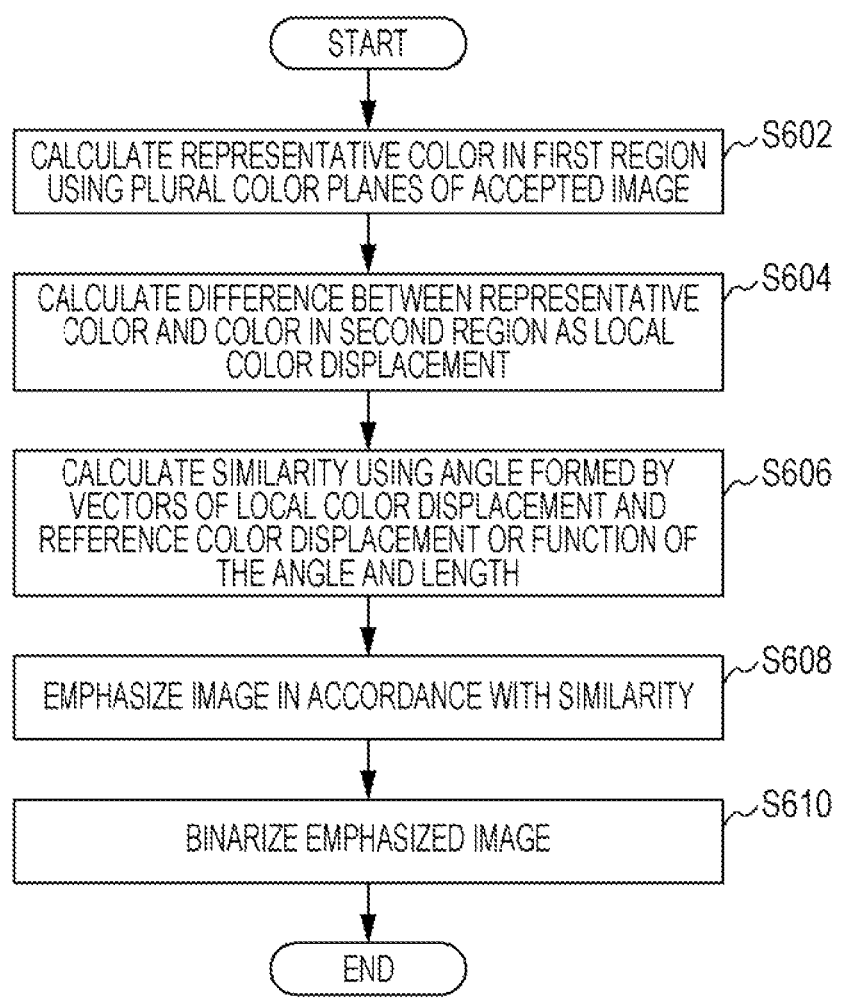
FIG. 6 is a flowchart illustrating an example of a process according to the second exemplary embodiment.

FIG. 6 is a flowchart illustrating an example of a process according to the second exemplary embodiment.

In step S602, the representative color calculation module 110 calculates a representative color in a first region by using plural color planes of an accepted image.

In step S604, the color displacement calculation module 120 calculates, as a local color displacement, the difference between the representative color and a color in a target second region.

In step S606, the similarity calculation module 140 calculates similarity by using an angle formed by vectors of the local color displacement and a reference color displacement, or a function of the angle and a length.

In step S608, the emphasizing module 550 emphasizes the image in accordance with the similarity.

In step S610, the binarization module 560 binarizes the emphasized image.

Additionally, ON pixels after the binarization in step S610 (pixels that remain after the binarization (typically, black pixels)) may be extracted as an information image.

Figure 7:
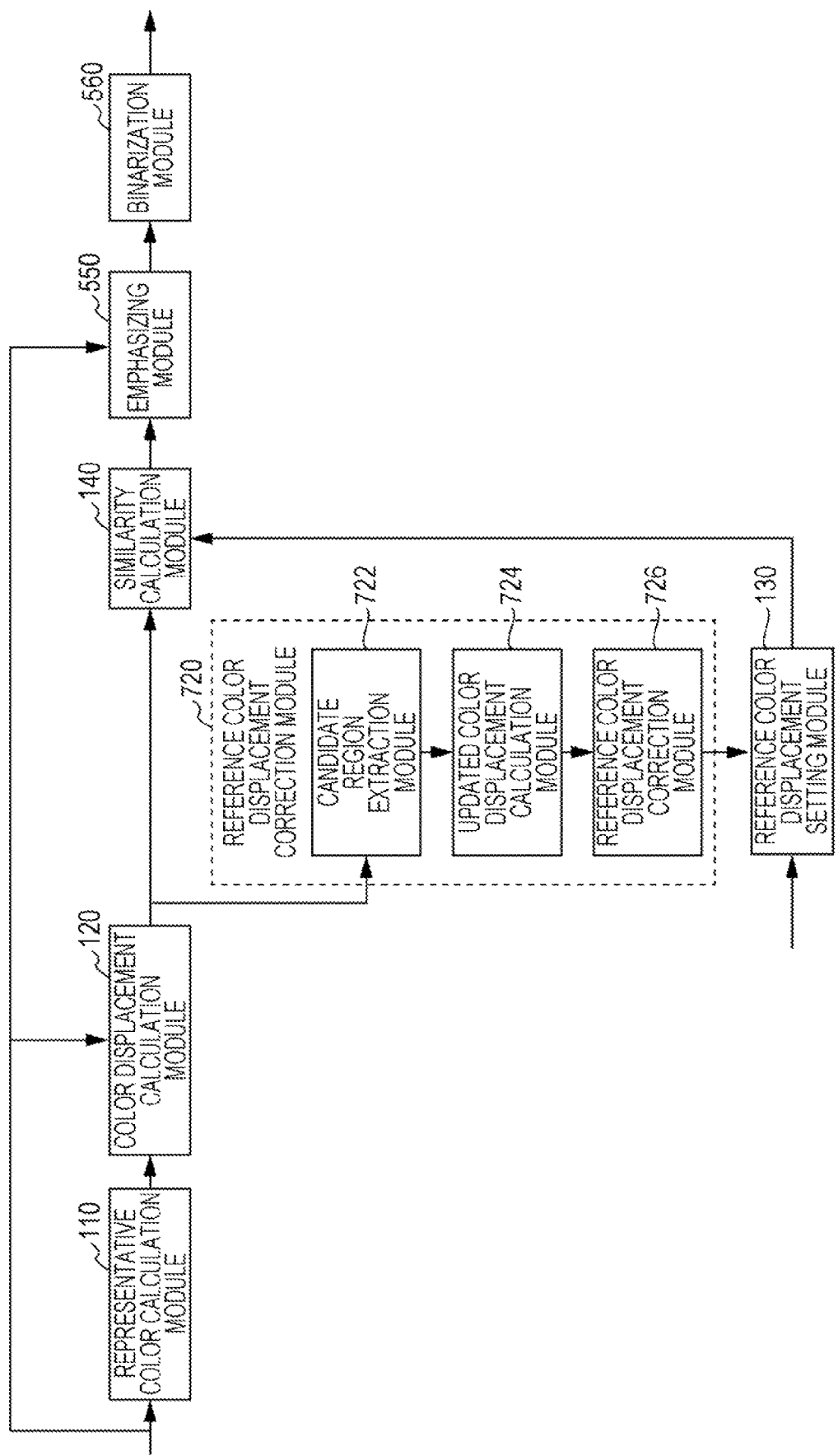
FIG. 7 is a conceptual module configuration diagram illustrating an example configuration of an image processing apparatus according to a third exemplary embodiment.

FIG. 7 is a conceptual module configuration diagram illustrating an example configuration of an image processing apparatus according to a third exemplary embodiment. As illustrated in FIG. 7, the image processing apparatus according to the third exemplary embodiment includes the representative color calculation module 110, the color displacement calculation module 120, a reference color displacement correction module 720, the reference color displacement setting module 130, the similarity calculation module 140, the emphasizing module 550, and the binarization module 560. The configuration according to the third exemplary embodiment includes the reference color displacement correction module 720 in addition to the modules according to the second exemplary embodiment. Alternatively, the configuration according to the third exemplary embodiment may include the reference color displacement correction module 720 in addition to the modules according to the first exemplary embodiment.

The color displacement calculation module 120 is connected, to the representative color calculation module 110, a candidate region extraction module 722, and the similarity calculation module 140.

The reference color displacement correction module 720 includes the candidate region extraction module 722, an updated color displacement calculation module 724, and a reference color displacement correction module 726. The reference color displacement correction module 720 corrects a reference color displacement in accordance with an accepted image. For example, the reference color displacement correction module 720 corrects a reference color displacement with respect to color change or color fluctuation of an accepted image.

The candidate region extraction module 722 is connected to the color displacement calculation module 120 and the updated color displacement calculation module 724. The candidate region extraction module 722 extracts color displacements which are calculated by the color displacement calculation module 120 and which are similar to a predetermined color displacement in an information image (the color displacement set by the reference color displacement setting module 130, that is, a reference color displacement). Here, being similar means that the difference between the reference color displacement and the color displacement calculated by the color displacement calculation module 120 is equal to or smaller than a predetermined threshold or is smaller than the predetermined threshold. For example, "difference in color displacement is equal to or smaller than a predetermined threshold or is smaller than the predetermined threshold" means that the color displacement calculated by the color displacement calculation module 120 exists within a predetermined angle with respect to the reference color displacement.

The updated color displacement calculation module 724 is connected to the candidate region extraction module 722 and the reference color displacement correction module 726. The updated color displacement calculation module 724 calculates a representative color displacement which is representative of the color displacements extracted by the candidate region extraction module 722. The representative color displacement is a color displacement which is representative of the color displacements extracted by the candidate region extraction module 722, and is calculated by using a statistical calculation method. For example, the representative color displacement may be an average color displacement of extracted color displacements, or may be a median value or a peak value. Since a color displacement is a vector, a representative color displacement may be calculated by obtaining statistical values of a length and a direction (angle).

The reference color displacement correction module 726 is connected to the updated color displacement calculation module 724 and the reference color displacement setting module 130. The reference color displacement correction module 726 corrects a predetermined color displacement in an information image in accordance with the representative color displacement calculated by the updated color displacement calculation module 724. For example, the representative color displacement may be regarded as a reference color displacement, a value calculated by weighting the representative color displacement and the reference color displacement may be regarded as a reference color displacement, or a value calculated by multiplying the representative color displacement by a coefficient may be regarded as a reference color displacement. Alternatively, the vector direction of the reference color displacement may be replaced by the vector direction of the representative color displacement.

The reference color displacement setting module 130 is connected to the reference color displacement correction module 726 and the similarity calculation module 140. The reference color displacement setting module 130 sets a reference color displacement in accordance with the color displacement corrected by the reference color displacement correction module 726.

Figure 8:
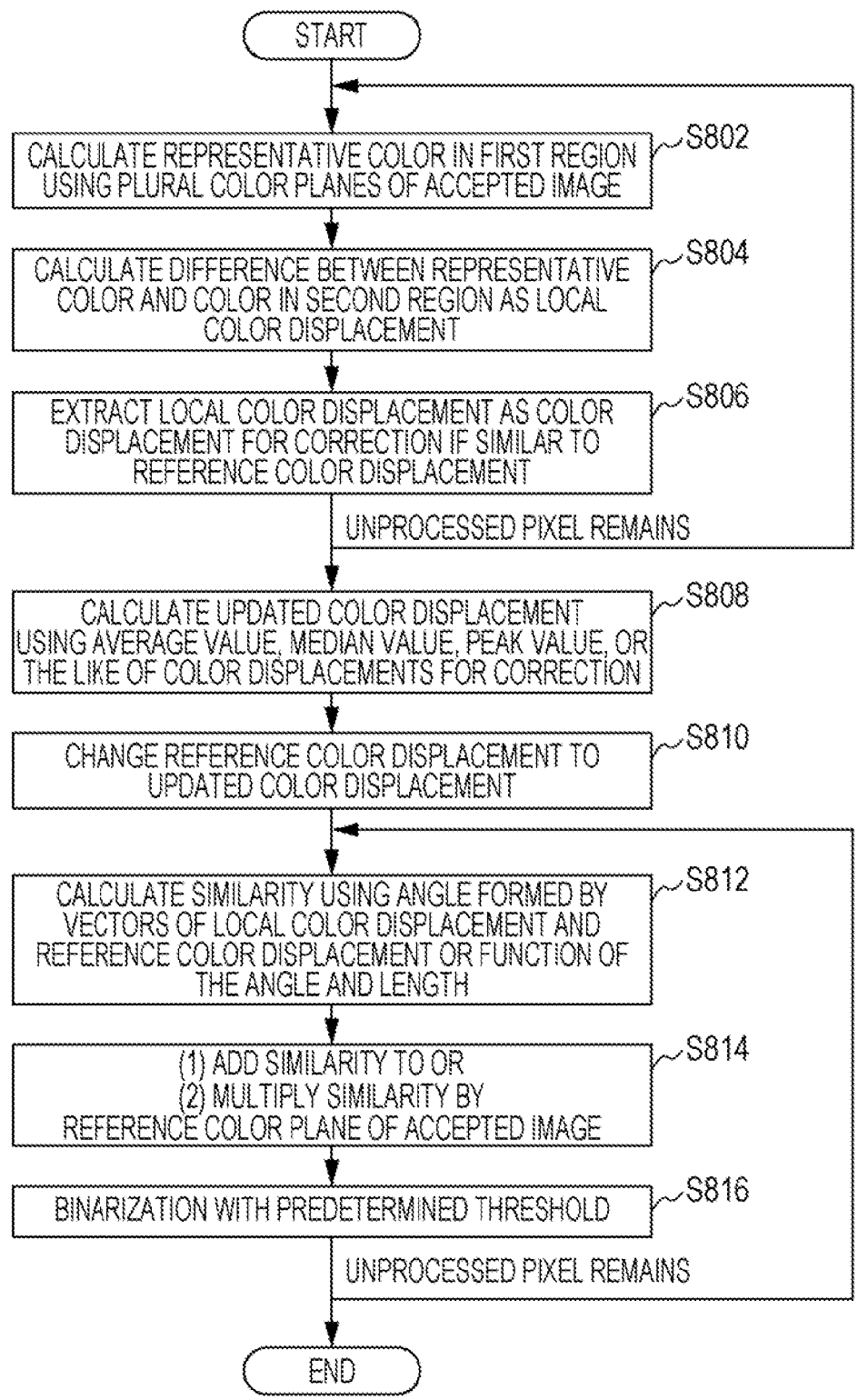
FIG. 8 is a flowchart illustrating an example of a process according to the third exemplary embodiment.

FIG. 8 is a flowchart illustrating an example of a process according to the third exemplary embodiment.

In step S802, the representative color calculation module 110 calculates a representative color in a first region by using plural color planes of an accepted image.

In step S804, the color displacement calculation module 120 calculates, as a local color displacement, the difference between the representative color and a color in a target second region.

In step S806, the candidate region extraction module 722 extracts a local color displacement as a color displacement for correction, if the local color displacement is similar to a reference color displacement.

After step S806, the process returns to step S802 if an unprocessed pixel remains in the accepted image, and the process proceeds to step S808 if no unprocessed pixels remain.

In step S808, the updated, color displacement calculation module 724 calculates an updated color displacement toy using an average value, a median value, a peak value, or the like of the extracted color displacements for correction.

In step S810, the reference color displacement correction module 726 changes the reference color displacement to the updated color displacement.

In step S812, the similarity calculation module 140 calculates similarity by using an angle formed by the vectors of the local color displacement and the reference color displacement, or a function of the angle and a length.

In step S814, the emphasizing module 550 (1) adds the similarity to or (2) multiplies the similarity by the reference color plane of the accepted image.

In step S816, the binarization module 560 performs binarization with a predetermined threshold.

After step S816, the process returns to step S812 if an unprocessed pixel remains in the accepted image, and the process ends if no unprocessed pixels remain.

Figure 9:
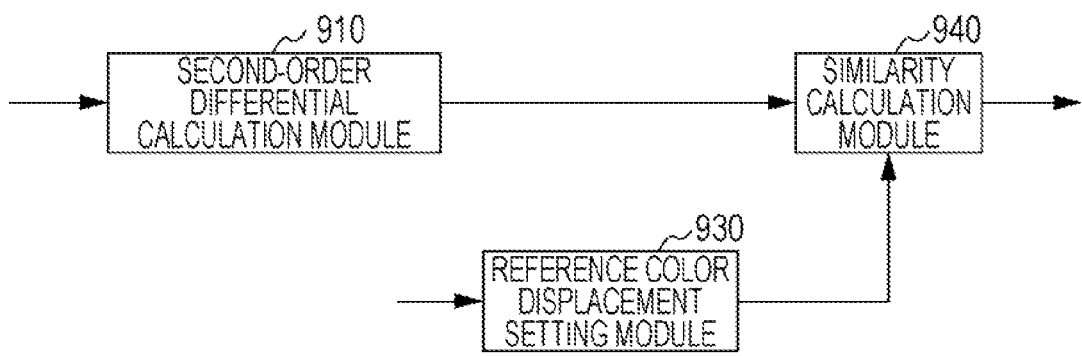
FIG. 9 is a conceptual module configuration diagram illustrating an example configuration of an image processing apparatus according to a fourth exemplary embodiment.

FIG. 9 is a conceptual module configuration diagram illustrating an example configuration of an image processing apparatus according to a fourth exemplary embodiment. As illustrated in FIG. 9, the image processing apparatus according to the fourth embodiment includes a second-order differential, calculation module 910, a reference color displacement setting module 930, and a similarity calculation module 940. The degree of change in color density is used as the color displacement according to the above-described embodiments.

The second-order differential calculation module 910 is connected to the similarity calculation module 940. The second-order differential calculation module 910 calculates a second-order differential value of a color in a region having a predetermined size in an image. Here, "a second-order differential value of a color" is obtained by performing Laplacian transform in each color plane. For example, when the number of colors is three, a vector in a three-dimensional space (a vector defined by an origin (0, 0, 0) and three second-order differential values (x, y, z)) is obtained.

The reference color displacement setting module 930 is connected to the similarity calculation module 940. The reference color displacement setting module 930 sets a second-order differential value of a normal information image. The color of the information image embedded in an image is predetermined, and thus a second-order differential value which is calculated in advance is set.

The similarity calculation module 940 is connected to the second-order differential calculation module 910 and the reference color displacement setting module 930. The similarity calculation module 940 calculates the similarity between the second-order differential value calculated by the second-order differential calculation module 910 and a second-order differential value expressing the predetermined color displacement of the information image representing information embedded in the image. As described above, a second-order differential value may be expressed by a vector, and calculation equivalent to that performed by the similarity calculation module 140 may be performed to calculate similarity.

Figure 10:
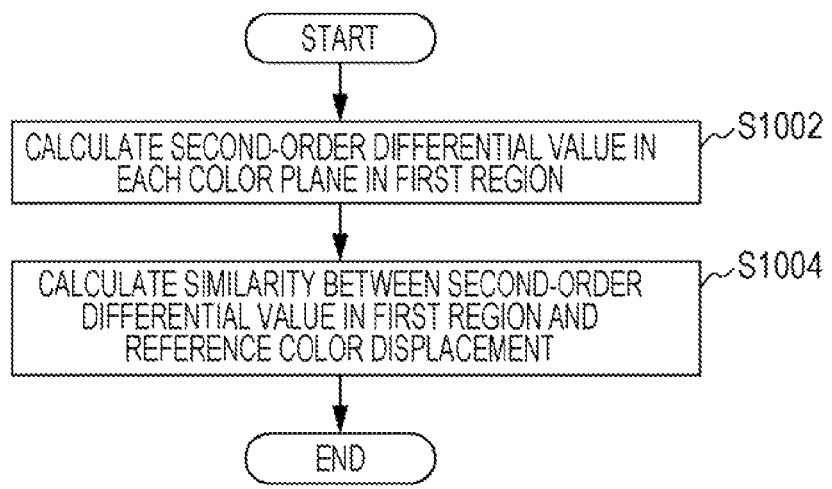
FIG. 10 is a flowchart illustrating an example of a process according to the fourth exemplary embodiment.

FIG. 10 is a flowchart illustrating an example of a process according to the fourth exemplary embodiment.

In step S1002, the second-order differential calculation module 910 calculates a second-order differential value in each color plane in a first region.

In step S1004, the similarity calculation module 940 calculates the similarity between the second-order differential value (three dimensions) in the first region and a reference color displacement (a second-order differential value (three dimensions)).

Figure 11:
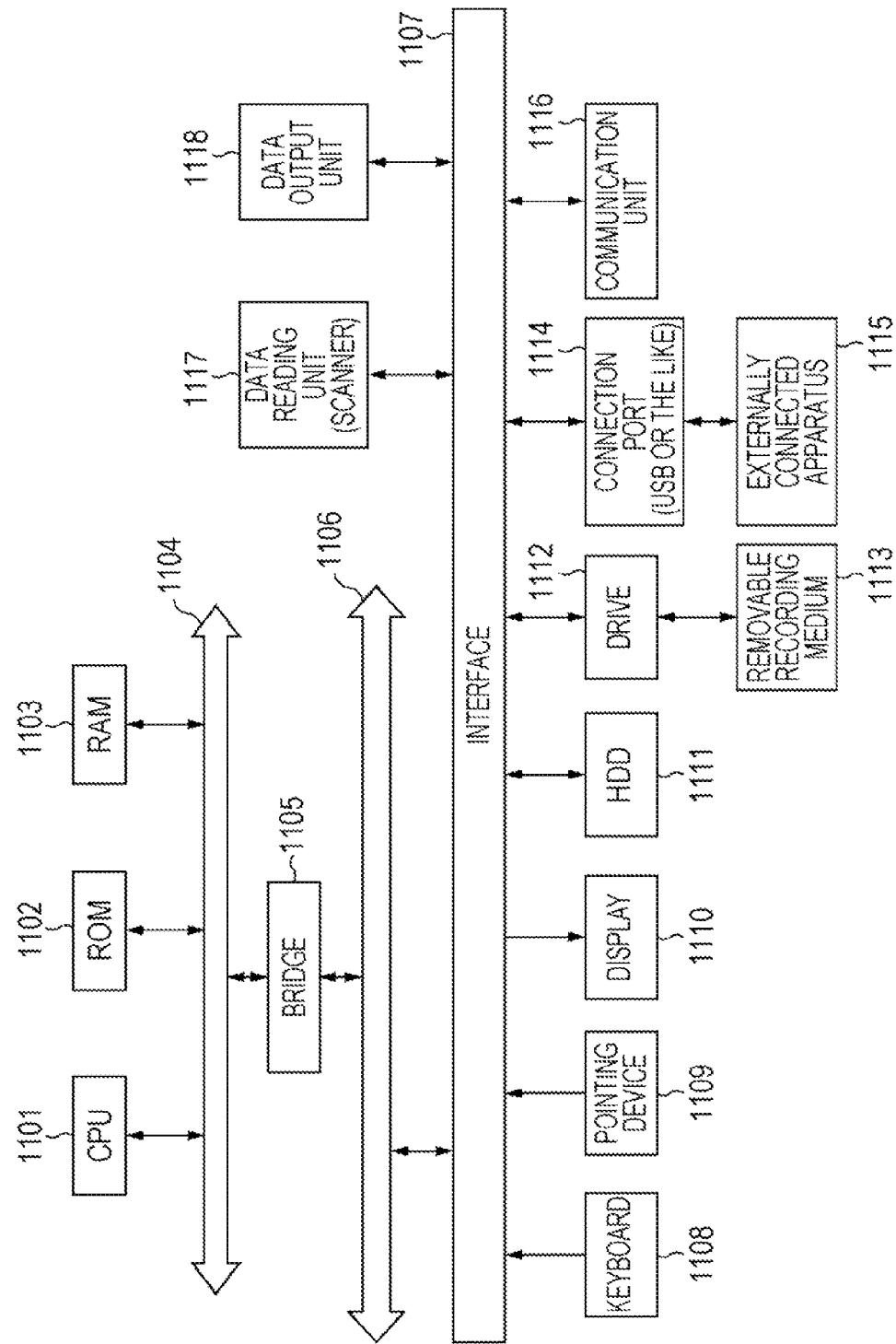
FIG. 11 is a block diagram illustrating a hardware configuration example of a computer that realizes the exemplary embodiments.

An example of the hardware configuration of the image processing apparatuses according to the above-described exemplary embodiments will be described with reference to FIG. 11. The configuration illustrated in FIG. 11 is the configuration of a personal computer (PC) or the like, and includes a data reading unit 1117 such as a scanner and a data output unit 1118 such as a printer.

A central processing unit (CPU) 1101 is a controller that executes processes in accordance with a computer program describing an execution sequence of the above-described modules, that is, the representative color calculation module 110, the color displacement calculation module 120, the reference color displacement setting module 130, the similarity calculation module 140, the emphasizing module 550, the binarization module 560, the reference color displacement correction module 720, the candidate region extraction module 722, the updated color displacement calculation module 724, the reference color displacement correction module 726, the second-order differential calculation module 910, the reference color displacement setting module 930, and the similarity calculation module 940.

A read only memory (ROM) 1102 stores programs, operation parameters, and so forth used by the CPU 1101. A random access memory (RAM) 1103 stores programs used for executing the CPU 1101, parameters that change in the execution, and so forth. The CPU 1101, the ROM 1102, and the RAM 1103 are connected to one another via a host bus 1104, such as a CPU bus.

The host bus 1104 is connected to an external bus 1106, such as a peripheral component interconnect/interface (PCI) bus, via a bridge 1105.

A keyboard 1108 and a pointing device 1109 such as a mouse are input devices operated by an operator. A display 1110 may be a liquid crystal display device or a cathode ray tube (CRT) device, and displays various pieces of information as text or image information.

A hard disk drive (HDD) 1111 includes a hard disk, drives the hard disk, and records or reproduces a program executed by the CPU 1101 and information. Information about an accepted image and information image is stored in the hard disk. Also, various computer programs including various data processing programs are stored therein.

A drive 1112 reads out data or a program recorded on a removable recording medium 1113 loaded therein, such as a magnetic disk, an optical disc, a magneto-optical disc, or a semiconductor memory. The drive 1112 supplies the data or program to the RAM 1103 connected thereto via an interface 1107, the external bus 1106, the bridge 1105, and the host bus 1104. The removable recording medium 1113 is available as a data recording region similar to the hard disk.

A connection port 1114 is a port for connecting an externally connected apparatus 1115, and includes a connection unit for a universal serial bus (USB), IEEE 1394, or the like. The connection port 1114 is connected to the CPU 1101 and so forth via the interface 1107, the external bus 1106, the bridge 1105, and the host bus 1104. The communication unit 1116 is connected to a communication line and performs data communication processing with an external apparatus. The data reading unit 111 is a scanner, for example, and reads a document. The data output unit 1118 is a printer, for example, and outputs document data.

The hardware configuration of the image processing apparatus illustrated in FIG. 11 is one configuration example. The configuration according to the above-described exemplary embodiments is not limited to the configuration illustrated in FIG. 11, and any configuration may be employed as long as the modules described in the above-described, exemplary embodiments are executable. For example, some of the modules may be constituted by dedicated hardware (for example, an application specific integrated circuit (ASIC)), and some of the modules may be in an external system and connected via communication lines. Furthermore, plural systems, each, being the system illustrated in FIG. 11, may be connected to one another via communication lines and may operate in conjunction with one another. Alternatively, the system may be incorporated in a copier, a facsimile, a scanner, a printer, a multifunction peripheral, (an image processing apparatus having two or more functions among scanner, printer, copier, and facsimile functions), or the like.

The above-described program may be provided by being stored in a recording medium, or may be provided via a communication medium. In that case, for example, the above-described program may be regarded as a "computer readable recording medium having the program recorded thereon".

The "computer readable recording medium having the program recorded thereon" is a computer readable recording medium having the program recorded thereon, which is used for installing, executing, or circulating the program.

The following are examples of the recording medium: a DVD-R, a DVD-RW, a DVD-RAM, and the like, which are digital versatile discs (DVDs) and standards established by the DVD forum; a DVD+R, a DVD+RW, and the like, which are standards established by the DVD+RW; compact discs (CDs) such as a read only memory (CD-ROM), a CD recordable (CD-R), and a CD rewritable (CD-RW); a Blu-ray Disc (registered trademark); a magneto-optical (MO) disc; a flexible disk (FD); a magnetic tape; a hard disk; a read only memory (ROM); an electrically erasable programmable read only memory (EEPROM, registered trademark); a flash memory; a random access memory (RAM); and a secure digital (SD) memory card.

The above-described program or a part of the program may be recorded on the recording medium and may be stored or circulated. Also, the program or a part of the program may be transmitted using a transmission medium, such as a wired network including a local area network (LAN), a metropolitan area network (MAN), a wide area network (WAN), the Internet, an intranet, and an extranet, or a wireless communication network, or a combination of the wired and wireless networks, or may be transferred using a carrier.

Furthermore, the above-described program may be a part of another program, or may be recorded on a recording medium together with another program. Alternatively, the program may be recorded on plural recording media in a divided manner. The program may be recorded in any form, as long as the program is recoverable, for example, the program may be compressed or encrypted.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a representative color calculation unit that calculates a representative color which is representative of colors in a first region having a predetermined size in an image;
    a color displacement calculation unit that calculates, as a color displacement, a difference between the representative color calculated by the representative color calculation unit and a color in a target second region in the first region; and
    a similarity calculation unit that calculates similarity between the color displacement calculated by the color displacement calculation unit and a predetermined color displacement in an information image representing information embedded in the image.

2. The image processing apparatus according to claim 1, further comprising:
    an emphasizing unit that emphasizes the image in accordance with the similarity calculated by the similarity calculation unit.

3. The image processing apparatus according to claim 2, further comprising:
    a binarization unit that binarizes the image in accordance with the similarity calculated by the similarity calculation unit or binarizes the image emphasized by the emphasizing unit.

4. The image processing apparatus according to claim 1, further comprising:
    an extraction unit that extracts color displacements which are calculated by the color displacement calculation unit and which are similar to the predetermined color displacement in the information image;
    a representative color displacement calculation unit that calculates a representative color displacement which is representative of the color displacements extracted by the extraction unit; and
    a correction unit that corrects the predetermined color displacement in the information image in accordance with the representative color displacement calculated by the representative color displacement calculation unit.

5. The image processing apparatus according to claim 2, further comprising:
    an extraction unit that extracts color displacements which are calculated by the color displacement calculation unit and which are similar to the predetermined color displacement in the information image;
    a representative color displacement calculation unit that calculates a representative color displacement which is representative of the color displacements extracted by the extraction unit; and
    a correction unit that corrects the predetermined color displacement in the information image in accordance with the representative color displacement calculated by the representative color displacement calculation unit.

6. The image processing apparatus according to claim 3, further comprising;
    an extraction unit that extracts color displacements which are calculated by the color displacement calculation unit and which are similar to the predetermined color displacement in the information image;
    a representative color displacement calculation unit that calculates a representative color displacement which is representative of the color displacements extracted by the extraction unit; and
    a correction unit that corrects the predetermined color displacement in the information image in accordance with the representative color displacement calculated by the representative color displacement calculation unit.

7. An image processing apparatus comprising:
    a second-order differential value calculation unit that calculates a second-order differential value of a color in a region having a predetermined size in an image; and
    a similarity calculation unit that calculates similarity between the second-order differential value calculated by the second-order differential value calculation unit and a second-order differential value expressing a predetermined color displacement in an information image representing information embedded in the image.

8. A non-transitory computer readable medium storing a program causing a computer to execute a process, the process comprising:
    calculating a representative color which is representative of colors in a first region having a predetermined size in an image;
    calculating, as a color displacement, a difference between the calculated representative color and a color in a target second region in the first region; and calculating similarity between the calculated color displacement and a predetermined color displacement in an information image representing information embedded in the image.

9. A non-transitory computer readable medium storing a program causing a computer to execute a process, the process comprising:
 calculating a second-order differential value of a color in a region having a predetermined size in an image; and
 calculating similarity between the calculated second-order differential value and a second-order differential value expressing a predetermined color displacement in an information image representing information embedded in the image.

* * * * *